United States Patent Office 3,212,997
Patented Oct. 19, 1965

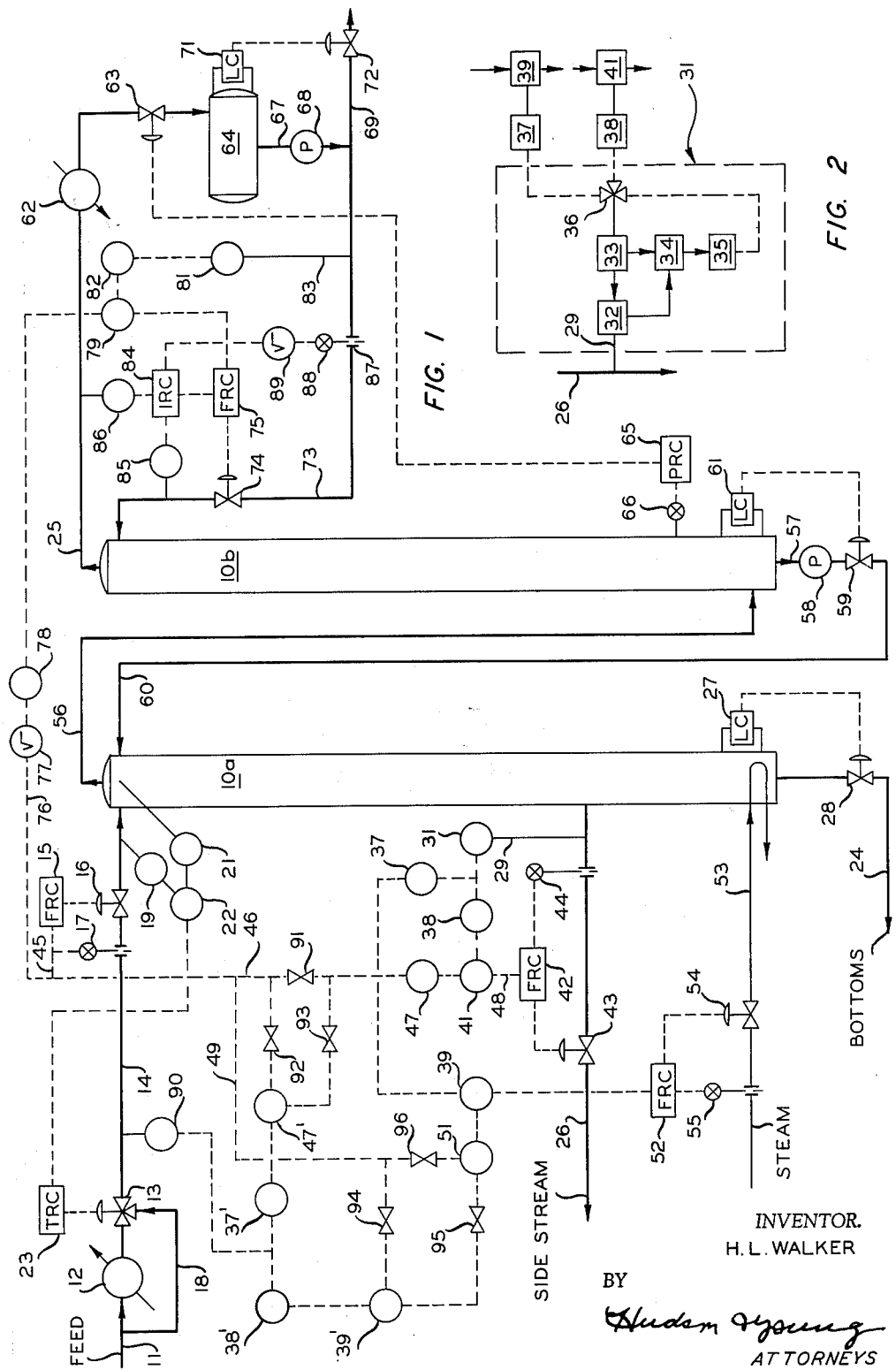

3,212,997
AUTOMATIC CONTROL IN FRACTIONAL
DISTILLATION
Harry L. Walker, Bartlesville, Okla., assignor to Phillips
Petroleum Company, a corporation of Delaware
Filed Mar. 13, 1961, Ser. No. 95,090
17 Claims. (Cl. 202—40)

This invention relates to the control of separation processes. In one aspect, this invention relates to the control system which automatically controls the separation process to produce two products of specification quality. In another aspect, this invention relates to a method for controlling the operation of fractionation columns in a stable manner. In still another aspect, the invention relates to a method and apparatus for controlling processes involving the separation of fluid mixtures into their various components. In another aspect, this invention relates to a method and apparatus for automatically controlling the withdrawal of a sidestream from a fractionation column, and is more particularly concerned with the method and apparatus for withdrawing a sidestream of a predetermined desired quality. In a still further aspect, this invention relates to a method and apparatus for controlling the rate of flow of heat around a heat exchanger to maintain a constant ΔT between the feed flowing into the column and the fluid on the inside of the column adjacent the feed entrance. In another aspect, this invention relates to a method and apparatus for maintaining a predetermined desired composition of a sidestream by controlling the rate of flow of steam to the fractionating column reboiler responsive to the composition of the sidestream and the rate of heat input to the column. In a still further aspect, this invention relates to a method and apparatus for controlling the rate of withdrawal of a sidestream responsive to the composition of the sidestream and to the rate of flow of feed input to the column. In another aspect, this invention relates to a method and apparatus for obtaining a constant differential temperature between the feed entering the column and the temperature adjacent the entry point. In a further aspect, this invention relates to a method and means for controlling the rate of withdrawal of a sidestream from a fractionation column responsive to the rate of flow of feed input to the column and/or the concentration of a first predetermined component in the feed and/or the concentration of a second predetermined component in the sidestream. In a still further aspect, this invention relates to a method and means for controlling the rate of flow of steam to the reboiler of a fractionation column responsive to the rate of flow of the feed input to the column, and/or the concentration of a first predetermined component in the feed, and/or the concentration of another predetermined component in the sidestream. In a further aspect, this invention relates to a method of controlling the rate of withdrawal of a sidestream from a fractionation column responsive to the rate of flow of feed input to the column. In yet another aspect, this invention relates to a method of controlling the rate of flow of a sidestream from a fractionation column responsive to the composition of the sidestream. In a further aspect, this invention relates to a method and apparatus for controlling the rate of flow of steam to the reboiler of a fractionation column responsive to the composition of the sidestream from the column. In yet another aspect, this invention relates to a method and apparatus for controlling the rate of addition of steam to the reboiler of a fractionation column responsive to the rate of flow of heat input to the column.

In the petroleum and petrochemical industries, considerable effort has been directed in recent years toward the development of more efficient separation processes. One of the most important aspects of this work concerns improvements in the control of separation processes so as to obtain a product stream having a specified purity. In the prior art separation processes which utilize fractionation columns, it is conventional to control the processes so that one stream only of specification quality is recovered as a product, the purity of the other product stream being in effect disregarded. For example, when the desired product is taken overhead from a fractionation column, the column is controlled so that the overhead product has the desired purity while the bottoms product has the composition resulting from the removal of all the remaining feed components as bottoms product.

When processing certain feed streams, which are essentially binary systems, it would be desirable to effect a separation so as to recover two products of specification quality. Such a separation would eliminate the necessity for further treatment of one of the column product streams as required in conventional processes, thereby bringing about a substantial saving in operational costs. Furthermore, it would be desirable if the fractionation equipment could be operated so as to process the maximum quantity of feed while producing the two products of specification quality. It may happen when separating an essentially binary feed mixture that there will be a sudden increase in the amount of a third component which is present in the mixture in a small amount. As a result of such an increase, the purity of one of the product streams is concomitantly decreased so that the recovered product has a purity less than that which is desired. In accordance with this invention, a control system is provided which automatically controls the operation of a fractional distillation column so as to produce two parts of specification quality at the maximum rate obtainable with the installed equipment while at the same time compensating for any changes in product purity caused by an increase in the amount of a third component present in the binary feed mixture.

The present invention is applicable to the control of fractional distillation columns. In separation processes of the type which this invention is concerned, use is made of towers or columns to effect the separation of the components in one operation. Fractionation columns which can be employed include sieve plate columns, bubble-cap plate columns, packed columns, and the like. Where a considerable difference in boiling points exists between the component to be separated and the other components in a feed mixture, simple fractional distillation is generally used to effect the desired separation. In such a process, there are certain process variables which must be closely controlled in order to bring about an efficient separation. These variables in an ordinary fractional distillation process include rate of overhead product withdrawal, rate of bottoms product withdrawal, rate of reflux, rate of feed introduction, rate of supply of of reboiler heat to the column, temperature of the feed, comparison with the temperature of the fluid in the column adjacent the entry of the feed point, and the rate of withdrawal of a side products stream.

It has been found that the operation of a fractionation column can be controlled so as to produce products of specification quality through the utilization of at least one of the following controls.

(1) Controlling the temperature of the feed to the column to maintain a constant differential temperature between the feed entering the column and the fluid on the inside of the column adjacent the feed entrance;

(2) controlling the rate of steam fed to the reboiler of the fractionation column responsive to at least one of the rate of flow of the feed input to the column, the composition of the feed input to the column, and the composition of the side-draw product stream; and (3) controlling the rate of withdrawal of the side-draw product stream responsive to at least one of the composition of the side-draw product stream, the composition of the feed input to the column, and the rate of flow of feed input to the column.

Accordingly, it is an object of this invention to provide a method for controlling separation processes. Another object of this invention is to provide a control system for use with a fractional distillation column which makes possible the recovery of two products of specification quality. Still another object of this invention is to provide an improved method and apparatus for controlling the operation of a fractional distillation column. A further object of this invention is to provide an improved method and apparatus for separating an essentially binary mixture into two products of specification quality.

Other aspects, objects, and the several advantages of the invention are apparent from a study of the disclosure, the drawing, and the appended claims.

According to the present invention, there are provided a method and apparatus for controlling the operation of a fractionation column which comprises at least one of the following:

(1) Controlling the temperature of the feed to the column to maintain a constant differential temperature between the feed entering the column and the fluid on the inside of the column adjacent the feed entrance;

(2) controlling the rate of steam fed to the reboiler of the fractionation column responsive to at least one of the rate of flow of feed input to the column, the composition of the feed input to the column, and the composition of the side-draw product stream; and (3) controlling the rate of withdrawal of the side-draw product stream responsive to at least one of the composition of the side-draw product stream, the composition of the feed input to the column, and the rate of flow of feed input to the column.

In the drawing, FIGURE 1 is a schematic view of a fractional distillation apparatus including the control system of this invention; and FIGURE 2 is a schematic diagram of an analyzer which is suitable for use in the present invention.

Referring now to the drawing, and in particular, to FIGURE 1, there is illustrated a fractional distillation column 10 of any suitable design employing vapor-liquid contacting means such as bubble-cap plates or the like. In the embodiment shown in FIGURE 1, columns 10a and 10b are two separated sections comprising one complete fractionation column 10, for structural reasons as known in the art. The essentially binary mixture to be separated is charged to column 10a through line 11, heat exchanger 12, 3-way valve 13, and line 14 at a rate controlled by rate of flow controller 15 which adjusts valve 16 in line 14 responsive to the output of rate of flow controller transmitter 17. A portion of the feed passing through line 11 is bypassed through line 18 around heat exchanger 12 and is returned to line 14 through 3-way valve 13. The amount of feed that bypasses heat exchanger 12 is regulated by 3-way motor valve 13. Resistance thermometer bulb 19 measures the temperature of the feed entering column 10a while resistance thermometer bulb 21 measures the temperature of the fluid in column 10a at a point adjacent the point of introduction of the feed to the column. These resistance bulbs transmit electrical signals to transducer 22, which can be a 0–20° F. temperature differential pneumatic transmitter, such as Model 700T–B–1–399 potentiometer transmitter listed in the Taylor Instrument Company's Bulletin 98262, February 1959. Transducer 22 transmits a pneumatic signal to temperature recorder controller 23 which in turn actuates 3-way motor valve 13 to maintain a desired temperature difference between the temperature of the feed entering the column and the temperature of the fluid in the column at a point adjacent the point of introduction of the feed to the column. In one specific operation, the temperature of the feed is maintained about 5° F. below the temperature of the fluid in the column at a point adjacent the point of introduction of the feed into the column.

Within column 10, the feed mixture is separated into a liquid kettle product which is withdrawn through line 24, a vaporous overhead product which is withdrawn through line 25, and a side-draw stream product which is withdrawn through line 26. The withdrawal of the liquid kettle product through line 24 is controlled by liquid level controller 27 which adjusts valve 28 in line 24 in response to the liquid level in the lower portion of column 10.

A portion of the side-draw stream product is withdrawn from line 26 through sample line 29 and is introduced into analyzer 31. Analyzer 31 can be any of the known analyzers, such as one composed of a chromatographic analyzer, programmer, transducer, and a peak selector connected in the manner shown in FIGURE 2. The operation of analyzer 31 will be described with reference to FIGURE 2 wherein analyzer 31 is shown as comprising a chromatographic analyzer 32, which can be any suitable chromatographic analyzer, such as analyzer Model 020, listed in Consolidated Electrodynamics' Bulletin 1860, March 1960; a suitable programmer 33, such as programmer Model 212, listed in Consolidated Electrodynamics' Bulletin 1860, March 1960; a peak selector 34, which can be any suitable conventional peak selector, such as peak selector Model SK1377, listed in Taylor Instrument Company Bulletin IED22707, January 6, 1960; a transducer 35, which can be any suitable conventional transducer; and a 3-way valve 36. The sample from line 26 passes through line 29 into chromatographic analyzer 32. Analyzer 32 and peak selector 34 are controlled by programmer 33. Electrical signals are passes from peak selector 34 to transducer 35 that are in proportion to the concentration of a first and second component in line 26. Transducer 35 sends pneumatic signals to controller 37 that are in proportion to the concentration of the first component in line 26 and pneumatic signals to controller 38 that are in proportion to the concentration of the second component in line 26. Programmer 33 switches valve 36 to send the signal of transducer 35, when it is related to the first component peak, to controller 37 and when it relates to the second component peak, to controller 38. Controller 37 sends a pneumatic signal to multiplier 39 that is related to the signal received from transducer 35 and the desired concentration of the first component in line 26. Controller 38 sends a pneumatic signal to multiplier 41 that is related to the signal received from transducer 35 and the desired concentration of the second component in line 26. Controllers 37 and 38 can be any suitable conventional controllers while multipliers 39 and 41 can be any suitable multiplier such as Sorteberg Type M Force Bridge Multiplier.

The rate of withdrawal of the side-draw stream product through line 26 is controlled by rate of flow controller 42 which adjusts the valve 43 in line 26 responsive to the signal from rate of flow transmitter 44. A pneumatic signal from rate of flow transmitter 17 is sent through line 45, line 46, time delay 47, and into multiplier 41. Multiplier 41 receives a signal from controller 38 that is related to the actual and desired concentration of the second component in line 26. Multiplier 41 sends a modified signal through line 48 that manipulates the setpoint of flow rate controller 42. The signal transmitted through line 46 is also passed through line 49, time delay relay 51 and into multiplier 39. Multiplier 39 receives a pneumatic signal from controller 37 that is related to the actual and desired concentration of the first component in line 26. Multiplier 39 sends a signal that manipulates the setpoint of flow rate controller 52. Flow rate controller 52 controls the rate of flow of steam through line 53 to the reboiler in the lower section of fractionation column 10 by manipulating valve 54 in line 53 responsive to a signal from rate of flow transmitter 55. Time delays 47 and 51 can be any suitable conventional time delays, such as Nullmatic Derivative Unit Model 59R inverse derivative listed in the condensed catalogue of Moore Products, 1958.

The overhead vapors from column 10a pass through line 56 and into the lower section of column 10b. Liquids collecting in the lower section of column 10b are withdrawn through line 57, pump 58, valve 59, and transmitted through line 60 to the upper section of column 10a. A liquid level controller 61 is attached to the lower portion of column 10b and adjusts valve 59 in line 60 responsive to the liquid level in the lower portion column 10b.

The overhead vapors from column 10b pass through line 25 through condenser 62 and valve 63 and into reflux accumulator 64. The rate of flow of condensed overhead vapors into accumulator 64 is controlled by motor valve 63 which is actuated by pressure recorder controller 65. Pressure transmitter 66 transmits a pneumatic signal to pressure recorder controller 65 that is in proportion to the pressure in column 10a adjacent the point of withdrawal of the side-draw stream product through line 26. While pressure transmitter 66 can be attached to the fractionation system at various points, depending upon the particular fractionation system and the constituents being separated, it is preferable that it be connected adjacent the point of withdrawal of the side-stream.

Liquid is withdrawn from reflux accumulator 64 through line 67 and pump 68. A portion of this withdrawn liquid is passed through product take-off line 69. The rate of flow of the liquid in product take-off line 69 is controlled by liquid level controller 71 which is attached to reflux accumulator 64, liquid level controller 71 adjusting valve 72 in line 69 responsive to the liquid level in reflux accumulator 64. The remainder of the liquid withdrawn from reflux accumulator 64 is passed through line 73 and into the upper portion of column 10b as reflux. The rate of flow of reflux passing through line 73 into column 10b is controlled by motor valve 74 which is actuated by rate of flow recorder controller 75. A pneumatic signal from rate of flow transmitter 17 is sent through line 76, square root extractor 77, time delay relay 78, and into multiplier 79. An analyzer 81 operates similarly to analyzer 31 with the exception that only a signal corresponding to conentration of a third component in line 73 is transmitted to controller 82. Thus, a portion of the reflux liquid is withdrawn from line 73 through line 83 into analyzer 81 wherein the concentration of a particular component is determined and a signal representative of that concentration is transmitted to controller 82. Controller 82 transmits a pneumatic signal to multiplier 79. Multiplier 79 passes a signal to rate of flow recorder controller 75 to manipulate the setpoint of the recorder controller 75. An internal reflux computer 84 is connected to temperature transmitter 85 which measures the temperature of reflux line 73, and to temperature transmitter 86 which measures the temperature of overhead vapor line 25. Internal reflux computer 84 is also connected to orifice 87 in line 73 through rate of flow transmitter 88 and square root extractor 89. The internal reflux computer 84 computes and transmits the measurement of internal reflux to flow rate controller 75, which in accordance with the desired value of internal reflux, operates valve 74 to obtain the desired reflux flow. Square root extractors 77 and 89 can be any suitable conventional square root extractor, such as Sorteberg Force Bridge Type S, described in Minneapolis-Honeywell Catalogue C–80–1. Time delay 78 can be any siutable time delay such as Nullmatic Derivative Unit Model 59R, inverse derivative, listed in the condensed catalogue of Moore Products, 1958. The internal reflux computer 84 can be any suitable internal reflux computer, such as that described in the Instrument Society of America Journal, June 1959.

In order to attain a better understanding of the invention, the fractional distillation process will be described with relation to a specific separation, such as the separation of isobutane from normal butane. Accordingly, an essentially binary mixture of normal butane and isobutane containing a small amount of other components, such as $C_3$ and $C_5$ hydrocarbons, is charged to fractionation column 10 through feed line 11. It is to be understood that the invention is not limited to this specific separation, for it is applicable to the separation of any essentially binary mixture. For example, the invention can be advantageously used in the separation of mixtures of isopentane and n-pentane, ethylene, propylene and propane, etc. This invention can also be used in the separation of multi-component mixtures containing components which can be divided into two classes or groups of materials. The invention is especially applicable to the separation of binary mixtures which, in addition to the two principal components, can contain a third or fourth component, the concentration of which in the feed mixture may vary materially during the separation process.

In the separation of normal butane and isobutane according to the present invention, isobutane is taken overhead as one product of the process while normal butane is recovered from a side-draw stream as a second product. When the feed mixture contains a third component, such as ethane and propone, this component is removed from the column along with the isobutane, and any components such as $C_5+$ will be removed as part of the kettle product. It should be apparent that if the concentration of the undesired components, such as ethane, propane, and pentane, varies during the separation process, the purity of the overhead product and the purity of the side-draw stream will be decreased a corresponding amount unless steps are taken to compensate for such increases in the concentration of the undesired components.

In the separation of normal butane, isobutane, isopentane, and neopentane, this invention involves the analysis of a normal butane side-draw stream for isobutane and neopentane. Thus, a sample is taken from side-draw stream 26 and passed through line 29 to analyzer 31 and analysis of the composition of the sample is made in chromatographic analyzer 32 and a signal representative of the analysis is transmitted to peak selector 34. Electrical signals are passed from peak selector 34 to transducer 35 which are in proportion to the concentration of isobutane and neopentane in line 26. Transducer 35 sends pneumatic signals to controller 37 that are in proportion to the concentration of isobutane in line 26 and pneumatic signals to controller 38 that are in proportion to the concentration of neopentane in line 26. Programmer 33 switches valve 36 to send a signal from transducer 35, when it relates to the isobutane peak, to controller 37 and when it relates to the neopentane peak to controller 38. Controller 37 sends a pneumatic signal to multiplier 39 that is related to the signal received from transducer 35 and the desired concentration of isobutane. Controller 38 sends a pneumatic signal to multiplier 41 that is related to the signal received from transducer 35 and the desired concentration of neopentane. Thus, the withdrawal of normal butane through side-stream 26 is controlled responsive to the rate of flow of feed into the column and responsive to the actual and desired concentration of neopentane in line 26. The signal transmitted from controller 38 to multiplier 41 decreases as the concentration of neopentane increases. The signal from rate of flow transmitter 17 to multiplier 41 increases as the rate of flow of feed in line 14 increases. The signal from multiplier 41 to rate of flow controller 42 increases as the signal from rate of flow transmitter 17 increases and the signal from multiplier 41 decreases when the signal from analyzer 31 increases. As the signal passed to rate of flow controller 42 increases, the rate of flow controller 42 is reset to increase the rate of flow through line 26. The rate of flow of steam to the reboiler through line 53 is controlled responsive to the rate of flow of feed input to the column and to the actual and desired concentration of isobutane in line 26. As the rate of flow of feed through line 14 increases, the signal passed through line 49 to multiplier 39 increases. As the isobutane content in line 26 increases, the signal from analyzer 31 to multiplier 39 is increased. Multiplier 39 transmits a signal to reset rate of flow controller 52 to increase the flow of steam through line 53 as the signal from multiplier 39 increases. The amount of feed in line 11 that bypasses heat exchanger 12 is regulated to maintain a temperature of the feed in the order of about 5° F. below the temperature of the fluids inside the column adjacent the point of entry of the feed into the column. Analyzer 81 determines the concentration of normal butane in a sample of the reflux liquid withdrawn from line 73 through line 83. Analyzer 81 then transmits a signal representative of the concentration of normal butane in line 73 to controller 82. Thus, the rate of return of reflux to the column through line 73 is controlled by the rate of flow recorder controller 75 responsive to the rate of flow of feed input to the column, the temperature of the overhead vapors in line 25, the temperature of the reflux liquid in line 73, and the concentration of normal butane in line 73.

A small sidestream of stream 11 is passed through analyzer 90. Analyzer 90, which can be the same type as analyzer 31, transmits a signal that relates to the concentration of normal butane in stream 11 to controller 37', and a signal that relates to the concentration of isobutane in stream 11 to controller 38'. Controllers 37' and 38' can be the same type as controllers 37 and 38. Multipliers 39' and 41' can be the same type as multipliers 39 and 41. Switches 91, 92, and 93 are included so that the analyzer system 90 can be either used in combination with transmitter 17 to provide a signal to multiplier 41 or used independently of transmitter 17, or cut out of service with respect to multiplier 41. Switches 94, 95, and 96 are included so that the analyzer system 90 can be either used in combination with transmitter 17 to provide a signal to multiplier 39, or used independently of transmitter 17, or cut out of service with respect to multiplier 39.

As the concentration of normal butane in stream 11 increases, the rate of withdrawal of normal butane should also be increased. Analyzer 90 can be used to correct for the change in concentration of normal butane in line 11. As the concentration of isobutane in line 11 increases, the rate of flow of steam for heating column 10a should be increased to vaporize the isobutane.

The following example will serve to illustrate one set of operating conditions of a fractionation process wherein the invention can be utilized to advantage.

EXAMPLE

Feed was passed through line 14 at the rate of 553,120 gallons per day at a temperature of 150° F. The temperature in the top of column 10a was 162° F. The side-draw product was removed through line 26 at the rate of 179,640 gallons per day at a temperature of 170° F. Saturated steam was added through line 53 at the rate of 39,000 pounds per hour, at a pressure of 45 p.s.i.g. The temperature in the bottom of column 10a was 176° F. and a pressure of 133 p.s.i.g. Overhead vapors from column 10b passed through line 56 at the rate of 2,662,635 gallons per day. The upper part of column 10b was maintained at 123 p.s.i.g. and 146° F. Reflux was added through line 73 at the rate of 2,349,113 gallons per day. The kettle product was withdrawn from column 10a at the rate of 54,958 gallons per day.

*Table I*

STREAM COMPOSITIONS

| Component | Mol Fractions | | | |
|---|---|---|---|---|
| | Feed | Kettle Product | Side-Draw Product | Overhead Product |
| Ethane | 0.0012 | 0.0000 | 0.0000 | 0.0021 |
| Propane | 0.0036 | 0.0000 | 0.0000 | 0.0063 |
| Isobutane | 0.5532 | 0.0022 | 0.0163 | 0.9616 |
| Normal Butane | 0.4250 | 0.8752 | 0.9692 | 0.0300 |
| Neopentane | 0.0117 | 0.0759 | 0.0126 | 0.0000 |
| Isopentane | 0.0053 | 0.0467 | 0.0019 | 0.0000 |

Reasonable variation and modification are possible within the scope of the foregoing disclosure, the drawing, and the appended claims to the invention, the essence of which is that there are provided a method and apparatus for controlling the operation of a fractionation column which comprises at least one of the following:

(1) Controlling the temperature of the feed to the column to maintain a constant differential temperature between the feed entering the column and the fluid on the inside of the column adjacent the feed entrance;

(2) controlling the rate of steam fed to the reboiler of the fractionation column responsive to at least one of the rate of flow feed input to the column, the composition of the feed input to the column, and the composition of the side-draw product stream; and (3) controlling the rate of withdrawal of the side-draw product stream responsive to at least one of the composition of the side-draw product stream, the composition of the feed input to the column, and the rate of flow of feed input to the column.

I claim:

1. In a fractionation apparatus for separating an essentially binary feed mixture containing a small amount of additional components comprising a fractionation column, means for introducing said feed mixture into said column, means for withdrawing an overhead product from said column, means for withdrawing a kettle product from said column, means for withdrawing a side-draw stream product from said column, reboiler means located in the lower section of said column, and means for introducing steam into said reboiler means; the improvement in means for controlling the operation of said column which comprises means for heating said feed mixture prior to introduction into said column, means for bypassing a portion of said feed mixture around said means for heating, means for producing a first signal representative of the temperature of said feed mixture as it is introduced into said column, and means for producing a second signal representative of the temperature of the fluids is said column adjacent the point of introduction of said feed mixture, means for comparing said first and said second signals, and means for controlling said means for bypassing responsive to the comparison of said first and second signals to maintain a substantially constant predetermined differential temperature between the temperature of said feed mixture as it is introduced into said column and the temperature of the fluid in said column adjacent the point of introduction of said feed mixture into said column, means for analyzing a sample of the side-draw stream product for the concentration of a first component and a second component, means for determining the rate of flow of said feed mixture into said column, means for determining the concentration of a third component in said feed mixture;

and means for controlling the rate of introduction of steam to said reboiler means responsive to said rate of flow of said fed mixture, the concentration of said third component in said feed mixture, and the concentration of said first component in said side-draw stream product; means for controlling the rate of withdrawal of said side-draw stream product from said column responsive to the concentration of said second component in said side-draw stream product, the concentration of said third component in said feed mixture, and the rate of flow of said feed mixture into said column; means for passing said overhead product through a condensing zone, a valve, and into a reflux accumulator, means for controlling said valve responsive to the pressure in said column adjacent the point of withdrawal of said side-draw stream product from said column, means for withdrawing the condensed liquids from said reflux accumulator, means for removing a portion of the thus withdrawn liquids as a product, means for introducing the remainder of the withdrawn liquids into an upper portion of said column as reflux liquid, means for determining the temperature of the overhead of said column, means for determining the temperature of said reflux liquid, means for determining the rate of flow of said reflux liquid, means for analyzing said reflux liquid for the concentration of a third component, and means for controlling the rate of introduction of the reflux liquid into said column responsive to said temperature of the overhead of said column, said temperature of said reflux liquid, said concentration of said third component in said reflux liquid, and the rate of introduction of said feed mixture into said column.

2. An apparatus suitable for separating an essentially binary feed mixture containing a small amount of additional components comprising a fractionation column, means for introducing the feed into said column, means for withdrawing an overhead product from said column, means for withdrawing a kettle product from said column, means for introducing heat into the lower section of said column, and means for controlling the operation of said column which comprises means for heating said feed prior to introduction into said column, means for bypassing a portion of said feed around said means for heating, means for producing a first signal representative of the temperature of said feed as it is introduced into said column, and means for producing a second signal representative of the temperature of the fluids in said column adjacent the point of introduction of said feed into said column, means for comparing said first and second signals, and means for controlling said means for bypassing responsive to the comparison of said first and second signals to maintain a substantially constant predetermined differential temperature between the temperature of said feed as it is introduced into said column and the temperature of the fluid in said column adjacent the point of introduction of said feed into said column.

3. An apparatus suitable for separating an essentially binary feed mixture containing a small amount of additional components comprising a fractionation column, means for introducing the feed into said column, means for withdrawing an overhead product from said column, means for withdrawing a kettle product from said column, means for withdrawing a side-draw stream product from said column, means for introducing heat into the lower section of said column, and means for controlling the operation of said column which comprises means for sensing the flow rate of said side-draw stream product and for regulating said flow rate responsive thereto, means for analyzing a sample of the side-draw stream product for the concentration of a predetermined component, means for determining the rate of flow of said feed into said column, and means for controlling the rate of introduction of heat into the lower section of said column responsive to said rate of flow of said feed and the concentration of said predetermined component in said side-draw stream product.

4. An apparatus suitable for separating an essentially binary feed mixture containing a small amount of additional components comprising a fractionation column, means for introducing the feed into said column, means for withdrawing an overhead product from said column, means for withdrawing a kettle product from said column, means for withdrawing a side-draw stream product from said column, means for introducing heat into the lower section of said column, and means for controlling the operation of said column which comprises means for analyzing a sample of the side-draw stream product for the concentration of a predetermined component, means for determining the rate of flow of said feed into said column, and means for sensing the flow rate of said side-draw stream product and for controlling the rate of withdrawal of said side-draw stream product from said column responsive to the concentration of said predetermined component in said side-draw stream product, the thus sensed side-draw stream flow rate, and the rate of flow of said feed into said column.

5. An apparatus suitable for separating an essentially binary feed mixture containing a small amount of additional components comprising a fractionation column, means for introducing the feed into said column, means for withdrawing an overhead product from said column, means for withdrawing a kettle product from said column, means for withdrawing a side-draw stream product from said column, means for introducing heat into the lower section of said column, and means for controlling the operation of said column which comprises means for analyzing a sample of the feed stream for the concentration of a predetermined component, means for determining the rate of flow of said feed stream into said column, and means for controlling the rate of withdrawal of said side-draw stream product from said column responsive to the concentration of said predetermined component in said feed stream and the rate of flow of said feed stream into said column.

6. In a fractionation apparatus for separating a feed mixture containing isobutane and n-butane and a small amount of additional components comprising a fractionation column, means for introducing said feed mixture into said column, means for withdrawing an overhead product from said column, means for withdrawing a kettle product from said column, means for withdrawing a side-draw stream product from said column, reboiler means located in the lower section of said column, and means for introducing steam into said reboiler means; the improvement in means for controlling the operation of said column to produce an overhead product of specification quality and a side-draw stream product of specification quality at the maximum ratio attainable with the equipment which comprises means for heating said feed mixture prior to introduction into said column, means for bypassing a portion of said feed mixture around said means for heating, means for producing a first signal representative of the temperature of said feed mixture as it is introduced into said column, and means for producing a second signal representative of the temperature of the liquid in said column adjacent the point of introduction of said feed mixture, means for comparing said first and second signals, and means for controlling said means for bypassing responsive to the comparison of said first and second signals to maintain a substantially constant predetermined differential temperature between the temperature of said feed mixture as it is introduced into said column and the temperature of the liquid in said column adjacent the point of introduction of said feed mixture into said column, means for analyzing a sample of the side-draw stream product for the concentration of isobutane and neopentane in said side-draw stream product, means for determining the rate of flow of said feed mixture into said column, and means for controlling the rate of introduction of steam to said reboiler means responsive to said rate of flow of said feed mixture and the concentration of isobutane in said side-draw stream product, means for controlling the rate of withdrawal of said side-draw stream product from said column responsive to the cencentration of neopentane in said side-draw stream product and the rate of flow of said feed mixture into said column, means for passing said overhead product through a condensing zone, a valve, and into a reflux accumulator, means for controlling said valve responsive to the pressure in said column adjacent the point of withdrawal of said side-draw stream product from said column, means for withdrawing the condensed liquids from said reflux accumulator, means for removing a portion of the thus withdrawn liquids as a product, means for introducing the remainder of the withdrawn liquids into an upper portion of said column as reflux liquid, means for determining the temperature of the overhead of said column, means for determining the temperature of said reflux liquid, means for determining the rate of flow of said reflux liquid, means for analyzing said reflux liquid for the concentration of n-butane in said reflux liquid, and means for controlling the rate of introduction of the reflux liquid into said column responsive to said temperature of the overhead of said column, said temperature of said reflux liquid, the determined rate of flow of reflux liquid, said concentration of n-butane in said reflux liquid, and the rate of introduction of said feed mixture into said column.

7. In a fractionation apparatus for separating an essentially binary feed mixture containing a small amount of additional components comprising a fractionation column, means for introducing said feed mixture into said column, means for withdrawing an overhead product from said column, means for withdrawing a kettle product from said column, means for withdrawing a side-draw stream product from said column, reboiler means located in the lower section of said column, and means for introducing steam into said reboiler means; the improvement in means for controlling the operation of said column to produce a side-draw stream product of specification quality, which comprises means for analyzing a sample of the side-draw stream product for the concentration of a first component and a second component, means for determining the rate of flow of said feed mixture into said column, means for determining the rate of flow of said side-draw stream product, means for controlling the rate of introduction of steam to said reboiler means responsive to said rate of flow of said feed mixture and the concentration of said first component in said side-draw stream product, and means for controlling the rate of withdrawal of said side-draw stream product from said column responsive to the concentration of said second component in said side-draw stream product, the determined rate of flow of said side draw stream product, and the rate of flow of said feed mixture into said column.

8. Apparatus for separating an essentially binary feed mixture containing a small amount of additional components comprising a fractionation column, means for introducing said feed mixture into said column, means for withdrawing an overhead product from said column, means for withdrawing a kettle product from said column, means for withdrawing a side-draw stream product from said column, means for introducing heat into the lower section of said column, and means for controlling the operation of said column which comprises means for heating said feed mixture prior to introduction into said column, means for bypassing a portion of said feed mixture around said means for heating, means for producing a first signal representative of the temperature of said feed mixture as it is introduced into said column, and means for producing a second signal representative of the temperature of the fluids in said column adjacent the point of introduction of said feed mixture, means for comparing said first and second signals, and means for controlling said means for bypassing responsive to the comparison of said first and second signals to maintain a substantially constant predetermined differential temperature between the temperature of said feed mixture as it is introduced into said column and the temperature of the fluid in said column adjacent the point of introduction of said feed mixture into said column, means for analyzing a sample of the side-draw stream product for the concentration of a first component and a second component, means for determining the rate of flow of said feed mixture into said column, and means for controlling the rate of introduction of heat into the lower section of said column responsive to said rate of flow of said feed mixture and the concentration of said first component in said side-draw stream product, and means for controlling the rate of withdrawal of said side-draw stream product from said column responsive to the concentration of said second component in said side-draw stream product and the rate of flow of said feed mixture into said column.

9. In a method for separating an essentially binary feed mixture containing a small amount of additional components into two product streams of specification quality in which the process variables include the rate of introduction of the feed mixture into a fractional distillation zone, the temperature of said feed mixture as it is introduced into said fractional distillation zone, the temperature of the fluids in said fractional distillation zone adjacent the point of introduction of said feed mixture, the rate of overhead product withdrawal from said zone, the rate of heat introduction into said fractional distillation zone, the rate of withdrawal of a side-draw stream product from said fractional distillation zone, the pressure in said fractional distillation zone adjacent the point of withdrawal of said side-draw stream product, the temperature of the overhead product as it is withdrawn from said fractional distillation zone, and the temperature of the reflux liquid as it is introduced into said fractional distillation zone, the improvement which comprises producing a first signal representative of the temperature of said feed mixture as it is introduced into said fractional distillation zone, producing a second signal representative of the temperature of the fluids in said fractional distillation zone adjacent the point of introduction of said feed mixture into said fractional distillation zone, comparing said first and second signals, varying the amount of heat supplied to said feed mixture prior to its introduction into said fractional distillation zone responsive to the comparison of said first and second signals, determining the rate of flow of said feed mixture into said fractional distillation zone, controlling the flow of said feed mixture into said fractional distillation zone to maintain a predetermined rate of flow of said feed mixture into said fractional distillation zone, analyzing a sample of the side-draw stream product for the concentration of a first component and a second component therein, controlling the rate of withdrawal of said side-draw stream product from said fractional distillation zone responsive to the concentration of said second component and to the rate of flow of said feed mixture into said fractional distillation zone, controlling the rate of introduction of heat to said fractional distillation zone responsive to the concentration of said first component in said side-draw stream product and to the rate of flow of said feed mixture into said fractional distillation zone, controlling the rate of withdrawal of the overhead product from said fractional distillation zone responsive to the pressure in said fractional distillation zone adjacent the point of withdrawal of said side-draw stream product from said fractional distillation zone, condensing the overhead product withdrawn from said fractional distillation zone, withdrawing a portion of the condensed liquids obtained from the condensation of the overhead product as a product of the system, introducing the remainder of said condensed liquids into said fractional distillation zone as reflux therefor, determining the temperature of the overhead product as it is withdrawn from said fractional distillation zone, determining the temperature of the condensed liquids which are introduced into said fractional distillation zone as reflux, determining the concentration of a third component in said condensed liquids which are introduced into said fractional distillation zone as reflux, and controlling the rate of introduction of said condensed liquids into said fractional distillation zone as reflux responsive to said temperature of the overhead product, said temperature of the condensed liquids which are introduced into said fractional distillation zone as reflux, and said concentration of said third component in said condensed liquids which are introduced into said fractional distillation zone as reflux.

10. A method for separating a feed mixture into two product streams in which the process variables include the temperature of said feed mixture as it is introduced into a fractional distillation zone and the temperature of the fluids in said fractional distillation zone adjacent the point of introduction of said feed mixture, which comprises producing a first signal representative of the temperature of said feed mixture as it is introduced into said fractional distillation zone, producing a second signal representative of the temperature of the fluids in said fractional distillation zone adjacent the point of introduction of said feed mixture into said fractional distillation zone, comparing said first and second signals, varying the amount of heat supplied to said feed mixture prior to its introduction into said fractional distillation zone responsive to the comparison of said first and second signals.

11. A method for separating a feed mixture into two product streams in which the process variables include the rate of introduction of feed material into a fractional distillation zone and the rate of heat introduction into said fractional distillation zone which comprises withdrawing an overhead product stream from said fractional distillation zone, withdrawing a bottom product stream from said fractional distillation zone, withdrawing a side-draw stream product from said fractional distillation zone, determining the rate of flow of said feed mixture into said fractional distillation zone, determining the flow rate of said side-draw stream product and regulating the side-draw stream product flow rate responsive to such determination, analyzing a sample of the side-draw stream product for the concentration of a predetermined component therein, and controlling the rate of introduction of heat into the fractional distillation zone responsive to the concentration of said predetermined component in said side-draw stream product and to the rate of flow of said feed mixture into said fractional distillation zone.

12. A method for separating a feed mixture into two product streams in which the process variables include the rate of introduction of feed material into a fractional distillation zone and the rate of withdrawal of a side-draw stream product from said fractional distillation zone, which comprises withdrawing an overhead product stream from said fractional distillation zone, withdrawing a bottom product stream from said fractional distillation zone, withdrawing a side-draw stream product from said fractional distillation zone, determining the rate of flow of said feed mixture into said fractional distillation zone, analyzing a sample of the side-draw stream product for the concentration of a predetermined component therein, determining the flow rate of said side-draw stream product, controlling the rate of withdrawal of said side-draw stream product from said fractional distillation zone responsive to the concentration of said predetermined component in said side-draw stream product to the determined flow rate of said side-draw stream product, and to the rate of flow of said feed mixture into said fractional distillation zone.

13. A method for separating a feed mixture into two product streams in which the process variables include the rate of introduction of feed material into a fractional distillation zone, the composition of the feed material, and the rate of withdrawal of a side-draw stream product from said fractional distillation zone, which comprises determining the rate of flow of said feed mixture into said fractional distillation zone, analyzing a sample of the feed mixture for a concentration of the predetermined component therein, controlling the rate of withdrawal of said side-draw stream product from said fractional distillation zone responsive to the concentration of said predetermined component in said feed mixture and responsive to the rate of flow of said feed mixture into said fractional distillation zone.

14. In a method for separating a feed mixture containing isobutane and n-butane and a small amount of additional components into two product streams of specification quality in which the process variables include the rate of introduction of the feed mixture into a fractional distillation zone, the temperature of said feed mixture as it is introduced into said fractional distillation zone, the temperature of the fluids in said fractional distillation zone adjacent the point of introduction of said feed mixture, the rate of overhead product withdrawal from said zone, the rate of kettle product withdrawal from said zone, the rate of heat introduction into said fractional distillation zone, the rate of withdrawal of a side-draw stream product from said fractional distillation zone, the pressure in said fractional distillation zone adjacent the point of withdrawal of said side-draw stream product, the temperature of the overhead product as it is withdrawn from said fractional distillation zone, the temperature of the reflux liquid as it is introduced into said fractional distillation zone, the improvement which comprises producing a first signal representative of the temperature of said feed mixture as it is introduced into said fractional distillation zone, producing a second signal representative of the temperature of the fluid in said fractional distillation zone adjacent the point of introduction of said feed mixture into said fractional distillation zone, comparing said first and second signals, varying the amount of heat supplied to said feed mixture prior to its introduction into said fractional distillation zone responsive to the comparison of said first and second signals, determining the rate of flow of said feed mixture into said fractional distillation zone, controlling the flow of feed mixture into said fractional distillation zone to maintain a predetermined rate of flow of said feed mixture into said fractional distillation zone, analyzing a sample of the side-draw stream product for the concentration of isobutane and neopentane therein, controlling the rate of withdrawal of said side-draw stream product from said fractional distillation zone responsive to the concentration of neopentane in said side-draw stream product and to the rate of flow of said feed mixture into said fractional distillation zone, controlling the rate of introduction of heat to the fractional distillation zone responsive to the concentration of said isobutane in said side-draw stream product and to the rate of flow of said feed mixture into said fractional distillation zone, controlling the rate of withdrawal of said kettle bottoms product responsive to the liquid level in the lower section of said fractional distillation zone, controlling the rate of withdrawal of the overhead product from said fractional distillation zone responsive to the pressure in said fractional distillation zone adjacent the point of withdrawal of said side-draw stream product from said fractional distillation zone, condensing the overhead product withdrawn from said fractional distillation zone, withdrawing a portion of the condensed liquids obtained from the condensation of the overhead product as a product of the system, introducing the remainder of said condensed liquids into said fractional distillation zone as reflux therefor, determining the temperature of the overhead product as it is withdrawn from said fractional distillation zone, determining the temperature of the condensed liquids which are introduced into said fractional distillation zone as reflux, determining the concentration of n-butane in said condensed liquids which are introduced into said fractional distillation zone as reflux, and controlling the rate of introduction of said condensed liquids into said fractional distillation zone as reflux responsive to said temperature of the overhead product, said temperature of the condensed liquids which are introduced into said fractional distillation zone as reflux, and said concentration of said third component in said condensed liquids which are introduced into said fractional distillation zone as reflux.

15. A method for separating an essentially binary feed mixture containing a small amount of additional components into two product streams of specification quality in which the process variables include the rate of introduction of the feed mixture into a fractional distillation zone, the rate of heat introduction into said fractional distillation zone, and the rate of withdrawal of a side-draw stream product from said fractional distillation zone, the improvement which comprises withdrawing an overhead product stream from said fractional distillation zone, withdrawing a bottom product stream from said fractional distillation zone, withdrawing a side-draw stream product from said fractional distillation zone, determining the rate of flow of said feed mixture into said fractional distillation zone, analyzing a sample of the side-draw stream product for the concentration of a first component and a second component therein, determining the flow rate of said side-draw stream product, controlling the rate of withdrawal of said side-draw stream product from said fractional distillation zone responsive to the concentration of said second component, to the determined flow rate of said side-draw stream product, and to the rate of flow of said feed mixture into said fractional distillation zone, and controlling the rate of introduction of heat to said fractional distillation zone responsive to the concentration of said first component in said side-draw stream product and to the rate of flow of said feed mixture into said fractional distillation zone.

16. A method for separating an essentially binary feed mixture containing a small amount of additional components into two product streams of specification quality in which the process variables include the rate of introduction of the feed mixture into a fractional distillation zone, the temperature of said feed mixture as it is introduced into said fractional distillation zone, the temperature of the fluids in said fractional distillation zone adjacent the point of introduction of said feed mixture, the rate of kettle product withdrawal from said zone, the rate of heat introduction into said zone, the rate of withdrawal of a side-draw stream product from said fractional distillation zone, the improvement which comprises producing a first signal representative of the temperature of said feed mixture as it is introduced into said fractional distillation zone, producing a second signal representative of the temperature of the fluid in said fractional distillation zone adjacent the point of introduction of said feed mixture into said fractional distillation zone, comparing said first and second signals, varying the amount of heat supplied to said feed mixture prior to its introduction into said fractional distillation zone responsive to the comparison of said first and second signals, determining the rate of flow of said feed mixture into said fractional distillation zone, controlling the flow of feed mixture into said fractional distillation zone to maintain a predetermined rate of flow of said feed mixture into said fractional distillation zone, analyzing a sample of the side-draw stream product for the concentration of a first component and a second component therein, controlling the rate of withdrawal of said side-draw stream product from said fractional distillation zone responsive to the concentration of said second component and responsive to the rate of flow of said feed mixture into said fractional distillation zone, controlling the rate of introduction of heat to the fractional distillation zone responsive to the concentration of said first component in said side-draw stream product and to the rate of flow of said feed mixture into said fractional distillation zone, and controlling the rate of withdrawal of said kettle bottoms product responsive to the liquid level in the lower section of said fractional distillation zone.

17. A method for separating an essentially binary feed mixture containing a small amount of additional components into two product streams of specification quality in which the process variables include the rate of introduction of the feed mixture into a fractional distillation zone, the rate of heat introduction into said fractional distillation zone, the rate of withdrawal of a side-draw stream product from said fractional distillation zone, and a composition of said feed mixture, the improvement which comprises determining the rate of flow of said feed mixture into said fractional distillation zone, analyzing a sample of said feed mixture for the concentration of a first component therein, analyzing a sample of the side-draw stream product for the concentration of a second component and a third component therein, controlling the rate of withdrawal of said side-draw stream product from said fractional distillation zone responsive to the concentration of said first component in said feed mixture, the concentration of said second component in said side-draw stream product, and the rate of flow of said feed mixture into said fractional distillation zone; and controlling the rate of introduction of heat to said fractional distillation zone responsive to the concentration of said first component in said feed mixture, the concentration of said third component in said side-draw stream product, and to the rate of flow of said feed mixture to said fractional distillation zone.

References Cited by the Examiner

UNITED STATES PATENTS

| | | |
|---|---|---|
| 1,940,802 | 12/33 | Kallam. |
| 2,246,934 | 6/41 | Denney _____ 202—160 X |
| 2,357,113 | 8/44 | Houghland et al. ____ 202—160 X |
| 2,529,030 | 11/50 | Latchum _____ 202—206 X |
| 2,684,326 | 7/54 | Boyd _____ 202—160 X |
| 2,749,281 | 6/56 | Ferro _____ 202—160 X |
| 2,795,537 | 6/57 | Kemp et al. _____ 202—160 X |
| 2,798,031 | 7/57 | Irvine _____ 202—160 X |
| 2,881,118 | 4/59 | Spann et al. _____ 202—160 |
| 2,882,693 | 4/59 | Clay _____ 202—160 |
| 2,900,312 | 8/59 | Gilmore _____ 202—160 |
| 2,915,462 | 12/59 | Salmon _____ 202—160 |
| 2,917,437 | 12/59 | Kleiss et al. _____ 202—160 |
| 2,977,289 | 3/61 | Kron _____ 202—160 |
| 2,985,565 | 5/61 | Bellinger _____ 202—160 |
| 2,990,437 | 6/61 | Berger _____ 202—160 X |
| 2,994,643 | 8/61 | Smalling _____ 202—160 X |
| 2,994,646 | 8/61 | Kleiss _____ 202—160 X |
| 2,995,544 | 8/61 | Bourgeois _____ 202—160 X |
| 3,004,089 | 10/61 | Hutto _____ 196—132 |
| 3,009,864 | 11/61 | Webb _____ 202—160 |
| 3,018,229 | 1/62 | Morgan _____ 202—160 |
| 3,020,213 | 2/62 | Lupfer _____ 202—160 |
| 3,050,450 | 8/62 | Kleiss et al. _____ 202—160 |

(Other references on following page)

FOREIGN PATENTS 1,093,333  11/60  Germany.

OTHER REFERENCES

"Instruments and Process Control," pub. by N.Y. State Vocational & Practical Arts Assn., 1945, pp. 155–185.

"Oil & Gas Journal," Nov. 25, 1948, pp. 85–89, 124.

"Automatic Control of Rectification Processes," Moscow, 1957, Translation from Russian by Consultants Bureau, Inc., N.Y., 1959, pp. 1–29 of translated cy. (Copy in Scientific Library.)

NORMAN YUDKOFF, *Primary Examiner.*

ALPHONSO SULLIVAN, *Examiner.*